United States Patent
Chen et al.

(10) Patent No.: US 11,656,394 B2
(45) Date of Patent: May 23, 2023

(54) SENSING DEVICE

(71) Applicant: LIQXTAL TECHNOLOGY INC., Tainan (TW)

(72) Inventors: Hung-Shan Chen, Tainan (TW); Ming-Syuan Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 17/386,525

(22) Filed: Jul. 27, 2021

(65) Prior Publication Data
US 2022/0283350 A1 Sep. 8, 2022

Related U.S. Application Data

(60) Provisional application No. 63/156,371, filed on Mar. 4, 2021.

(51) Int. Cl.
*G02B 5/30* (2006.01)
*G01J 1/42* (2006.01)

(52) U.S. Cl.
CPC .......... *G02B 5/3016* (2013.01); *G01J 1/4204* (2013.01)

(58) Field of Classification Search
CPC ............................. G02B 5/3016; G01J 1/4204
USPC .................................. 349/86–94, 96–98, 194
See application file for complete search history.

(56) References Cited

U.S. PATENT DOCUMENTS

| | | | |
|---|---|---|---|
| 9,612,152 B2 | 4/2017 | deJong et al. | |
| 2004/0008298 A1 | 1/2004 | Kwok et al. | |
| 2004/0202849 A1* | 10/2004 | Nishikouji | B32B 27/08 428/212 |
| 2013/0083276 A1* | 4/2013 | Iwahashi | G03C 1/76 347/110 |
| 2019/0324598 A1* | 10/2019 | Ueki | B32B 23/08 |

FOREIGN PATENT DOCUMENTS

KR 20200145111 12/2020

* cited by examiner

*Primary Examiner* — Charles S Chang
(74) *Attorney, Agent, or Firm* — JCIPRNET

(57) ABSTRACT

A sensing device includes a sensor, a reflective polarizer disposed on the sensor, a dye-doped polymeric layer disposed on the reflective polarizer, and a patterned liquid crystal polymer layer disposed on the dye-doped polymeric layer.

18 Claims, 9 Drawing Sheets

SENSING DEVICE

CROSS-REFERENCE TO RELATED APPLICATION

This application claims the priority benefit of U.S. Provisional Application No. 63/156,371, filed on Mar. 4, 2021. The entirety of the above-mentioned patent application is hereby incorporated by reference herein and made a part of this specification.

BACKGROUND

Technical Field

The disclosure relates to an electronic device; more particularly, the disclosure relates to a sensing device.

Description of Related Art

Many applications need polarizers to capture and analyze optical information. However, a single type polarizer (e.g., a right-handed circular polarizer or a single direction linear polarizer) is not enough to do a full analysis. For some applications, right-handed and left-handed circular polarizers, or linear polarizers with different polarization directions are needed. It is not practical to change polarizer frequently for applications such as under display or reflective surface noise improvement. Patterned polarizer with high extinction ratio on sensor is necessary.

SUMMARY

The disclosure is directed to a sensing device, which has high extinction ratio.

According to an embodiment of the disclosure, a sensing device includes a sensor, a reflective polarizer disposed on the sensor, a dye-doped polymeric layer disposed on the reflective polarizer, and a patterned liquid crystal polymer layer disposed on the dye-doped polymeric layer.

According to an embodiment of the disclosure, the reflective polarizer is a wire grid polarizer.

According to an embodiment of the disclosure, an absorption axis of the dye-doped polymeric layer is defined by the wire grid polarizer.

According to an embodiment of the disclosure, the sensing device further includes an overcoating layer coated on the wire grid polarizer.

According to an embodiment of the disclosure, the reflective polarizer includes a cholesteric liquid crystal polymer layer.

According to an embodiment of the disclosure, the cholesteric liquid crystal polymer layer is a stacked layer of multiple layers with different pitches.

According to an embodiment of the disclosure, the dye-doped polymeric layer includes an iodine dopant or a dichroic dye dopant.

According to an embodiment of the disclosure, the sensing device further includes an alignment layer disposed between the reflective polarizer and the dye-doped polymeric layer, wherein an absorption axis of the dye-doped polymeric layer is defined by the alignment layer.

According to an embodiment of the disclosure, the patterned liquid crystal polymer layer serves as a half waveplate or a quarter waveplate.

According to an embodiment of the disclosure, the patterned liquid crystal polymer layer includes a plurality of regions having a plurality of different optical axis directions.

According to an embodiment of the disclosure, the patterned liquid crystal polymer layer is a stacked layer of multiple material layers with different birefringence.

According to an embodiment of the disclosure, optical axes of the patterned liquid crystal polymer layer are twisted aligned in light propagation direction.

According to an embodiment of the disclosure, the sensing device further includes an alignment layer disposed between the dye-doped polymeric layer and the patterned liquid crystal polymer layer, wherein optical axes of the patterned liquid crystal polymer layer are defined by the alignment layer.

According to an embodiment of the disclosure, the sensing device further includes a liquid crystal polymer layer disposed between the reflective polarizer and the dye-doped polymeric layer.

According to an embodiment of the disclosure, the liquid crystal polymer layer serves as a quarter waveplate.

According to an embodiment of the disclosure, the liquid crystal polymer layer is a patterned liquid crystal polymer layer that includes a plurality of regions having a plurality of different optical axis directions.

According to an embodiment of the disclosure, the liquid crystal polymer layer is a non-patterned liquid crystal polymer layer that includes a single optical axis direction.

According to an embodiment of the disclosure, the sensing device further includes a protection layer disposed between the dye-doped polymeric layer and the patterned liquid crystal polymer layer.

According to an embodiment of the disclosure, the sensing device further includes a protection layer disposed on the patterned liquid crystal polymer layer.

According to an embodiment of the disclosure, the sensor is an ambient light sensor, a fingerprint recognition sensor, or an image sensor.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following embodiments, terms used to indicate directions, such as "up," "down," "front," "back," "left," and "right", merely refer to directions in the accompanying drawings. Thus, the direction languages is used for description, but not intended to limit the scope of the disclosure.

In the accompanying drawings, the drawings illustrate the general features of methods, structures, and/or materials used in the particular exemplary embodiments. However, the drawings should not be interpreted as defining or limiting the scope or nature covered by the exemplary embodiments. For example, for clarity, the relative size, thickness and location of each layer, region and/or structure may be reduced or enlarged.

Terms such as "first" and "second" mentioned throughout the specification or the claims of this application are only for naming the names of the elements or distinguishing different embodiments or scopes and are not intended to limit the upper limit or the lower limit of the number of the elements nor intended to limit manufacturing sequences or disposition sequences of the elements.

Figure 1:
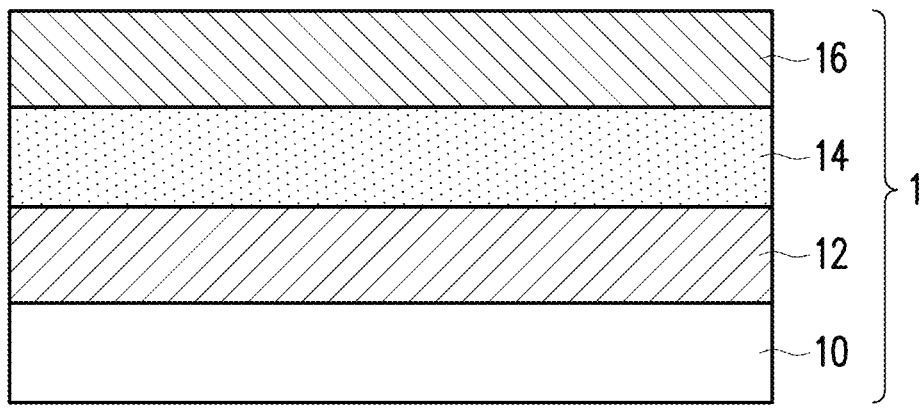
FIG. 1 is a partial schematic cross-sectional view of a sensing device according to some exemplary embodiments of the disclosure.
Figure 2A:
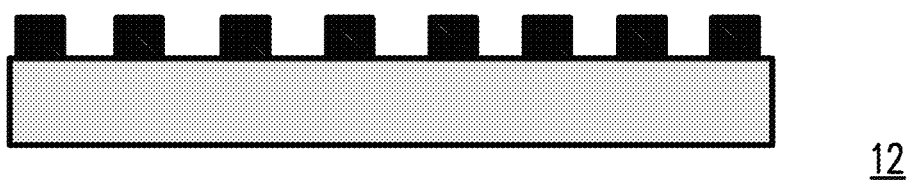
FIG. 2A to FIG. 2C are three partial schematic cross-sectional views of the reflective polarizer in FIG. 1.
Figure 2B:
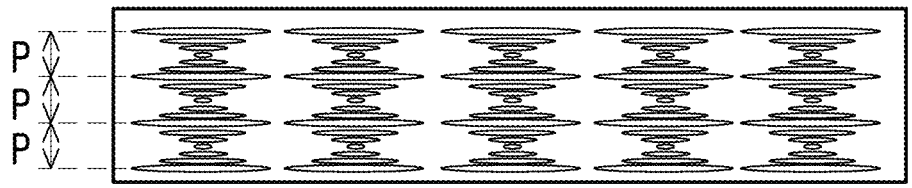
Figure 2C:
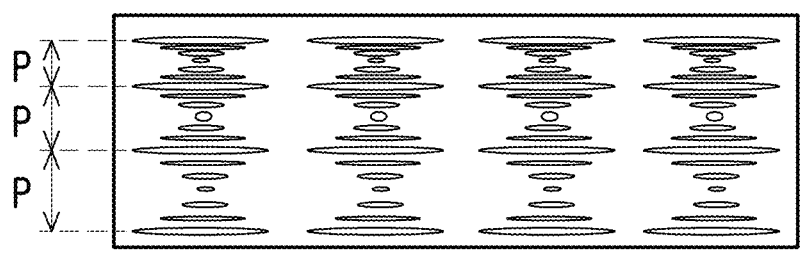
Figure 3A:
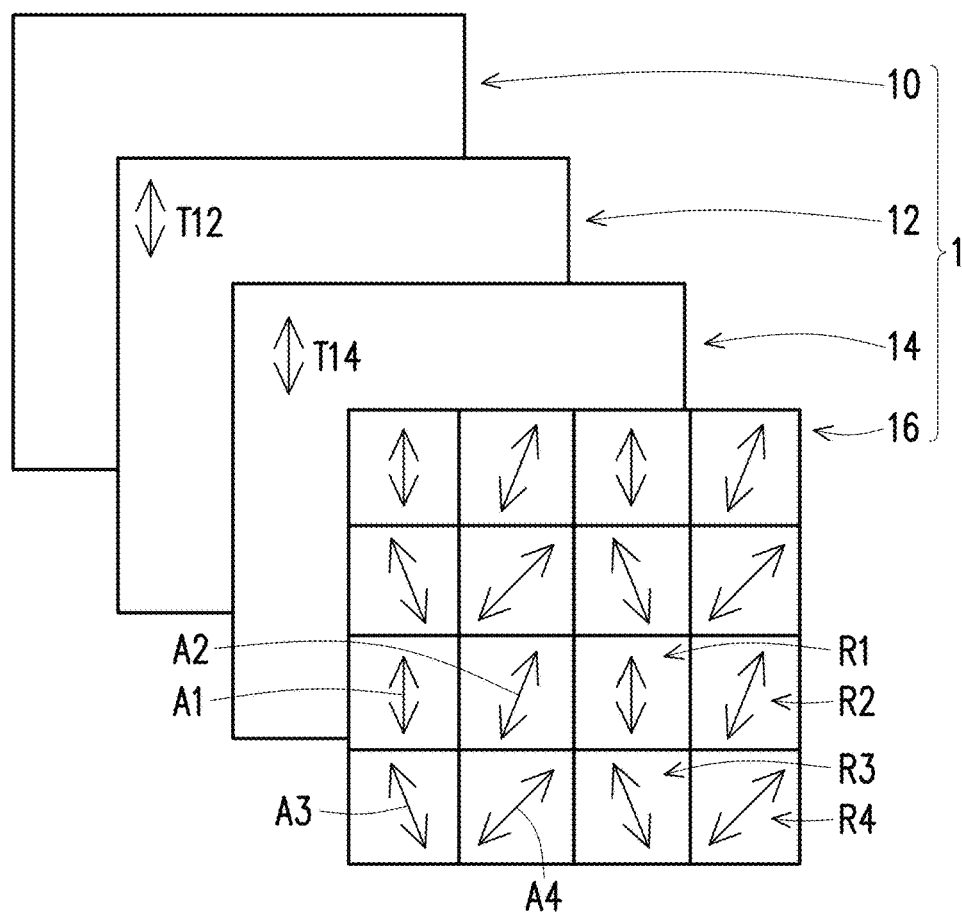
FIG. 3A is a partial schematic exploded view of a sensing device according to some embodiments of the disclosure.
Figure 3B:
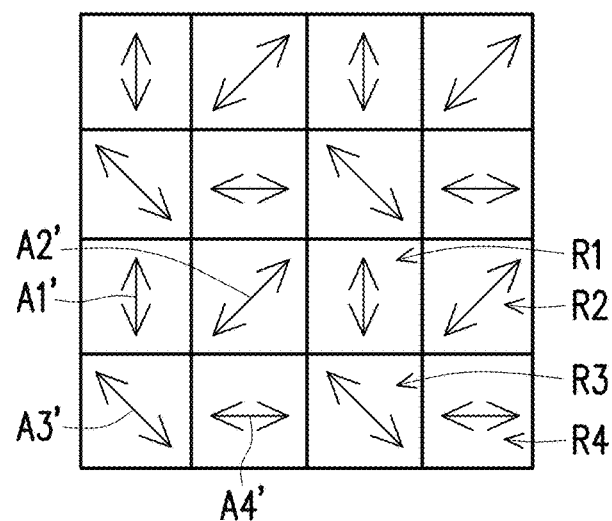
FIG. 3B is a partial schematic view that illustrates polarization of light that can pass through regions of the patterned liquid crystal polymer layer in FIG. 3A.
Figure 4A:
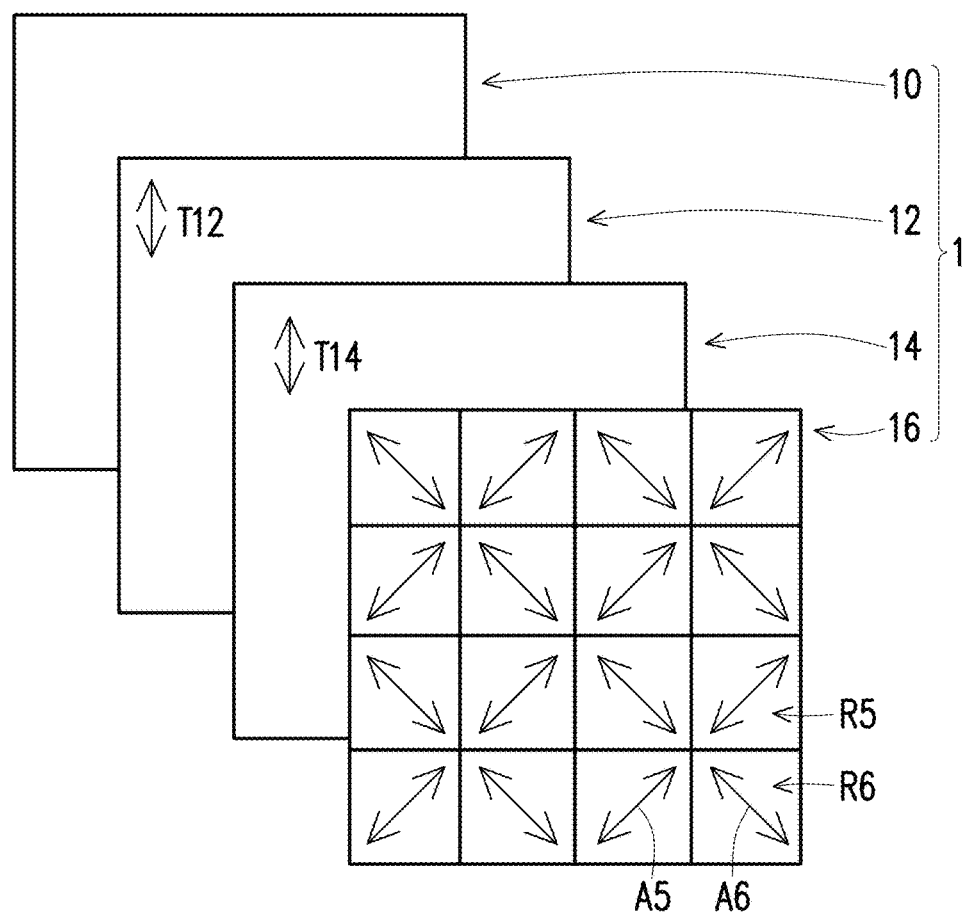
FIG. 4A is a partial schematic exploded view of a sensing device according to other embodiments of the disclosure.
Figure 4B:
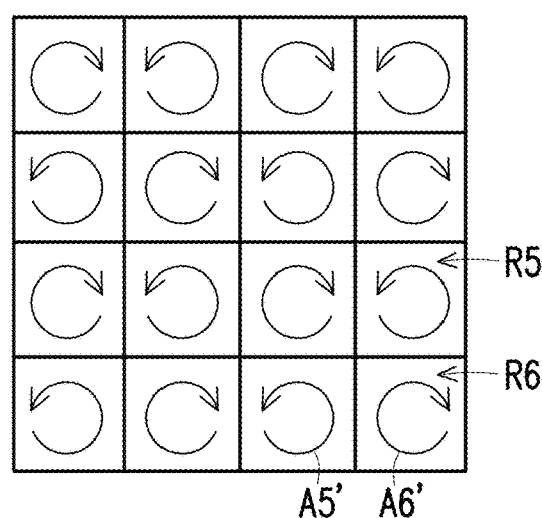
FIG. 4B is a partial schematic view that illustrates polarization of light that can pass through regions of the patterned liquid crystal polymer layer in FIG. 4A.
Figure 5:
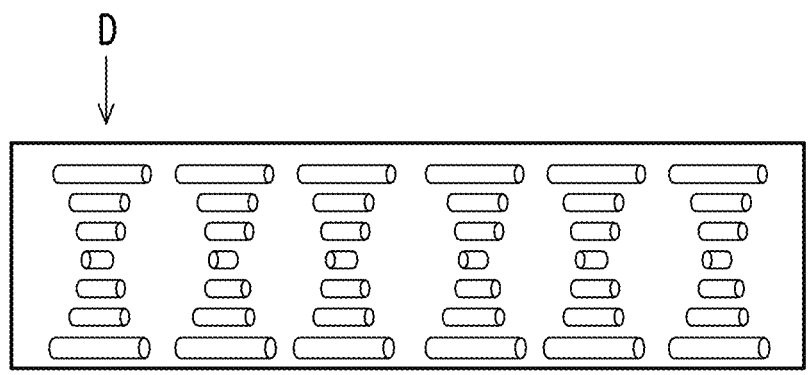
FIG. 5 is a partial schematic cross-sectional view of a patterned liquid crystal polymer layer according to some exemplary embodiments of the disclosure.
Figure 11:
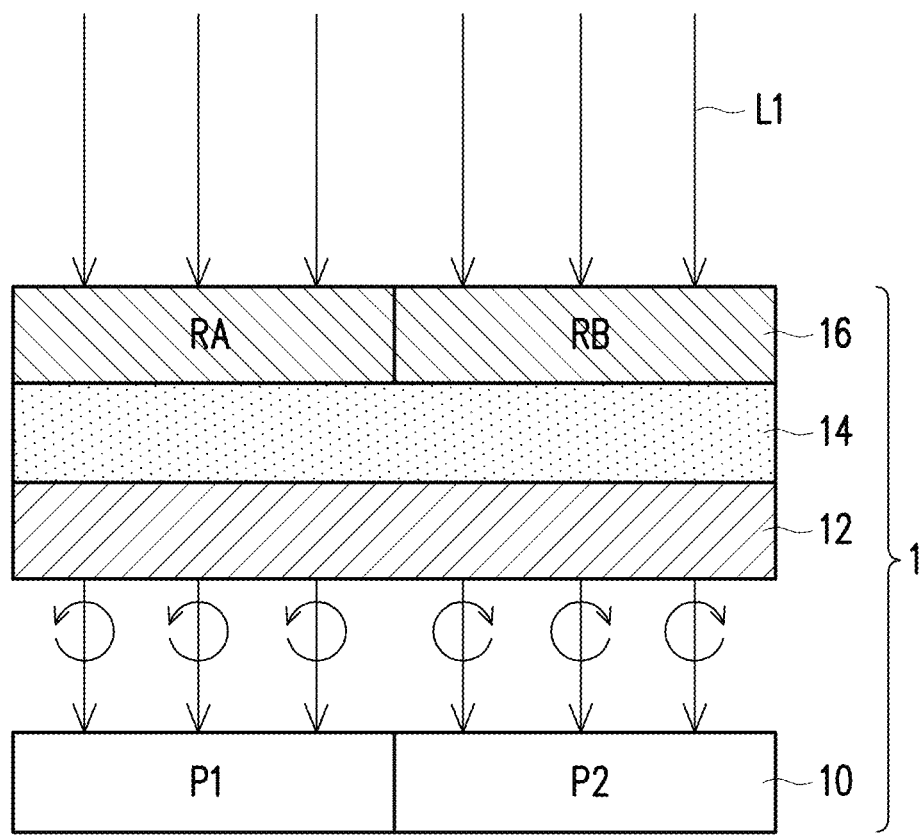
FIG. 11 and FIG. 12 are schematic views of optical paths of sensing devices according to some embodiments of the disclosure.
Figure 12:
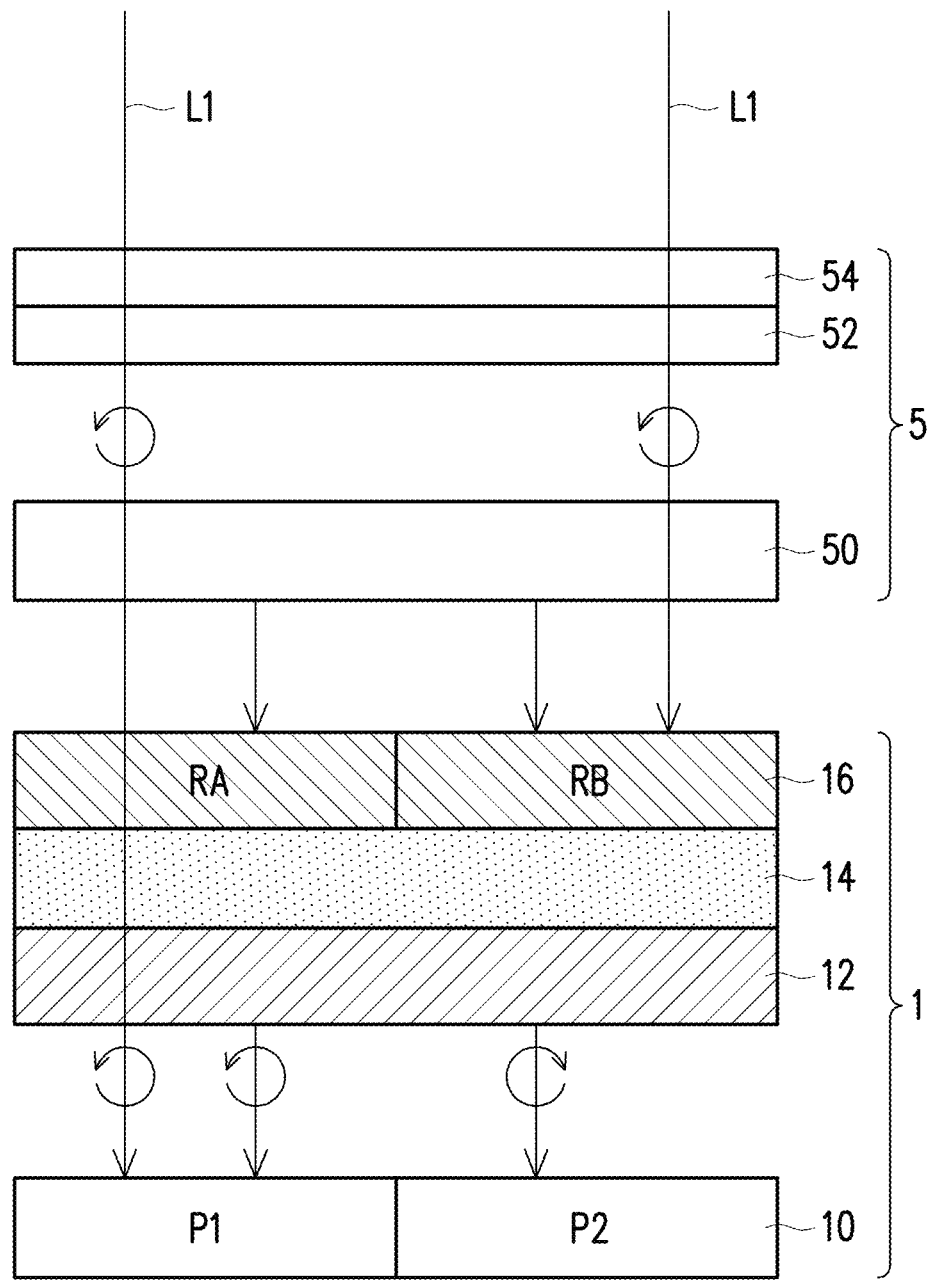

FIG. 1 is a partial schematic cross-sectional view of a sensing device according to some exemplary embodiments of the disclosure. FIG. 2A to FIG. 2C are three partial schematic cross-sectional views of the reflective polarizer in FIG. 1. FIG. 3A is a partial schematic exploded view of a sensing device according to some embodiments of the disclosure. FIG. 3B is a partial schematic view that illustrates polarization of light that can pass through regions of the patterned liquid crystal polymer layer in FIG. 3A. FIG. 4A is a partial schematic exploded view of a sensing device according to other embodiments of the disclosure. FIG. 4B is a partial schematic view that illustrates polarization of light that can pass through regions of the patterned liquid crystal polymer layer in FIG. 4A. FIG. 5 is a partial schematic cross-sectional view of a patterned liquid crystal polymer layer according to some exemplary embodiments of the disclosure. FIG. 6 to FIG. 10 are partial schematic cross-sectional views of sensing devices according to some exemplary embodiments of the disclosure. FIG. 11 and FIG. 12 are schematic views of optical paths of sensing devices according to some embodiments of the disclosure.

In the embodiments shown in FIG. 1 to FIG. 12, the same or similar elements will be designated by the same or similar reference numerals, and related descriptions will be omitted. In addition, the features of different exemplary embodiments may be combined with each other when they are not in conflict, and simple changes and modifications which are made according to the specification or the claims still pertain to the scope of the application.

Referring to FIG. 1, a sensing device 1 may include a sensor 10, a reflective polarizer 12, a dye-doped polymeric layer 14, and a patterned liquid crystal polymer layer 16, but not limited thereto.

The sensor 10 is configured to receive light incident on the sensing device 1 from the side of the patterned liquid crystal polymer layer 16. For example, the sensor 10 may be an ambient light sensor, a fingerprint recognition sensor, or an image sensor, but not limited thereto.

The reflective polarizer 12 is disposed on the sensor 10. The reflective polarizer 12 allows light with specific polarization direction or polarization state to pass through (e.g., the reflective polarizer 12 allows light whose polarization direction is parallel to a transmission axis T12 (shown in FIG. 3A or FIG. 4A) of the reflective polarizer 12 to pass through) and reflects light with other polarization direction or polarization state. For example, the reflective polarizer 12 may include a wire grid polarizer (as shown in FIG. 2A) or a cholesteric liquid crystal polymer layer (as shown in FIG. 2B or FIG. 2C). The wire grid polarizer allows light with specific linear polarization direction to pass through and reflects light with other linear polarization direction. The cholesteric liquid crystal polymer layer allows light with specific circular polarization direction to pass through and reflects light with other circular polarization direction. The cholesteric liquid crystal polymer layer may be a stacked layer of multiple layers with same pitches P (as shown in FIG. 2B). Alternatively, the cholesteric liquid crystal polymer layer may be a stacked layer of multiple layers with different pitches P (as shown in FIG. 2C) to obtain wider spectral range.

Referring to FIG. 1, the dye-doped polymeric layer 14 is disposed on the reflective polarizer 12. The dye-doped polymeric layer 14 allows light with specific polarization direction or polarization state to pass through (e.g., the dye-doped polymeric layer 14 allows light whose polarization direction is parallel to a transmission axis T14 (shown in FIG. 3A or FIG. 4A) of the dye-doped polymeric layer 14 to pass through) and absorbs light with other polarization direction or polarization state. For example, the dye-doped polymeric layer 14 includes an iodine dopant or a dichroic dye dopant, but not limited thereto.

In the embodiments where the reflective polarizer 12 is a wire grid polarizer, an absorption axis (not shown in FIG. 1) of the dye-doped polymeric layer 14 may be defined by the wire grid polarizer, but not limited thereto. In other embodiments where the reflective polarizer 12 includes a wire grid polarizer or a cholesteric liquid crystal polymer layer, the absorption axis of the dye-doped polymeric layer 14 may be defined by an alignment layer (not shown in FIG. 1) disposed between the dye-doped polymeric layer 14 and the reflective polarizer 12.

The patterned liquid crystal polymer layer 16 is disposed on the dye-doped polymeric layer 14. In some embodiments, the patterned liquid crystal polymer layer 16 serves as a half waveplate (as shown in FIG. 3A and FIG. 3B) or a quarter waveplate (as shown in FIG. 4A and FIG. 4B), and the patterned liquid crystal polymer layer 16 may include a plurality of regions having a plurality of different optical axis directions.

In the embodiments shown in FIG. 3A and FIG. 3B, the patterned liquid crystal polymer layer 16 includes a plurality of regions R1 to R4, and the plurality of regions R1 to R4 respectively have optical axis directions A1 to A4 different from each other. For example, an included angle (e.g., θ1, not shown in FIG. 3A) between the optical axis direction A1 and the transmission axis T14 of the dye-doped polymeric layer 14 is 0 degrees, an included angle (e.g., θ2, not shown in FIG. 3A) between the optical axis direction A2 and the transmission axis T14 of the dye-doped polymeric layer 14 is 22.5 degrees, an included angle (e.g., θ3, not shown in FIG. 3A) between the optical axis direction A3 and the transmission axis T14 of the dye-doped polymeric layer 14 is −22.5 degrees, and an included angle (e.g., $\theta 4$, not shown in FIG. 3A) between the optical axis direction A4 and the transmission axis T14 of the dye-doped polymeric layer 14 is 45 degrees.

In the embodiments where the patterned liquid crystal polymer layer 16 serves as a half waveplate, the light passing through the regions R1 to R4 respectively rotates twice the included angle $\theta 1$ to $\theta 4$. In other words, light with polarization direction A1' can pass through regions R1 when an included angle between the polarization direction A1' and the transmission axis T14 of the dye-doped polymeric layer 14 is 0 degrees; light with polarization direction A2' can pass through regions R2 when an included angle between the polarization direction A2' and the transmission axis T14 of the dye-doped polymeric layer 14 is 45 degrees; light with polarization direction A3' can pass through regions R3 when an included angle between the polarization direction A3' and the transmission axis T14 of the dye-doped polymeric layer 14 is −45 degrees; and light with polarization direction A4' can pass through regions R4 when an included angle between the polarization direction A4' and the transmission axis T14 of the dye-doped polymeric layer 14 is 90 degrees.

In the embodiments shown in FIG. 4A and FIG. 4B, the patterned liquid crystal polymer layer 16 includes a plurality of regions R5 and R6, and the plurality of regions R5 and R6 respectively have optical axis directions A5 and A6 different from each other. For example, an included angle (e.g., $\theta 5$, not shown in FIG. 4A) between the optical axis direction A5 and the transmission axis T14 of the dye-doped polymeric layer 14 is 45 degrees, and an included angle (e.g., $\theta 6$, not shown in FIG. 4A) between the optical axis direction A6 and the transmission axis T14 of the dye-doped polymeric layer 14 is −45 degrees.

In the embodiments where the patterned liquid crystal polymer layer 16 serves as a quarter waveplate, the light with left-handed circular polarization A5' passes through the regions R5 and turns into linear polarized light, and the light with right-handed circular polarization A6' passes through the regions R6 and turns into linear polarized light.

It is noted that the number of the regions in the patterned liquid crystal polymer layer 16 and the optical axis directions of the regions can change according to needs and therefore not limited to those shown in FIG. 3A to FIG. 4B.

In some embodiments, although not shown, the patterned liquid crystal polymer layer 16 may be a stacked layer of multiple material layers with different birefringence to provide wavelength insensitive retardation value. In this way, the phase retardation values of different wavelengths can be close, and thus higher extinction ratio can be achieved. The birefringence or thickness of each material layer, the number of the material layers, the stack order of the material layers can be controlled according to different needs, and therefore the design parameters listed above are not restricted here.

In some embodiments, as shown in FIG. 5, optical axes of the patterned liquid crystal polymer layer 16 can be twisted aligned in light propagation direction D to improve the effective wavelength range or wavelength insensitive diffraction efficiency. For example, the bottom layer of the patterned liquid crystal polymer layer 16 may be formed from right-handed circular polymer, and the top layer of the patterned liquid crystal polymer layer 16 may be formed from left-handed circular polymer, but not limited thereto.

Figure 6:
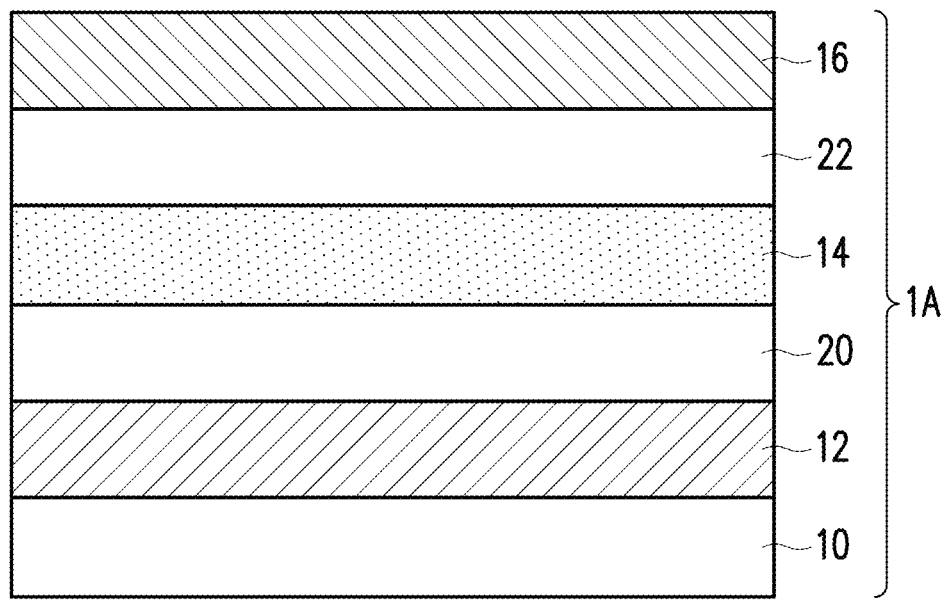
FIG. 6 to FIG. 10 are partial schematic cross-sectional views of sensing devices according to some exemplary embodiments of the disclosure.

In some embodiments, as shown in FIG. 6, a sensing device 1A may further include an alignment layer 20 and an alignment layer 22 in addition to the sensor 10, the reflective polarizer 12, the dye-doped polymeric layer 14, and the patterned liquid crystal polymer layer 16. The alignment layer 20 is disposed between the reflective polarizer 12 and the dye-doped polymeric layer 14, wherein an absorption axis (not shown in FIG. 6) of the dye-doped polymeric layer 14 may be defined by the alignment layer 20. The alignment layer 22 is disposed between the dye-doped polymeric layer 14 and the patterned liquid crystal polymer layer 16, wherein optical axes (not shown in FIG. 6; see optical axis directions A1 to A4 in FIG. 3A or optical axis directions A5 and A6 in FIG. 4A) of the patterned liquid crystal polymer layer 16 may be defined by the alignment layer 22.

Figure 7:
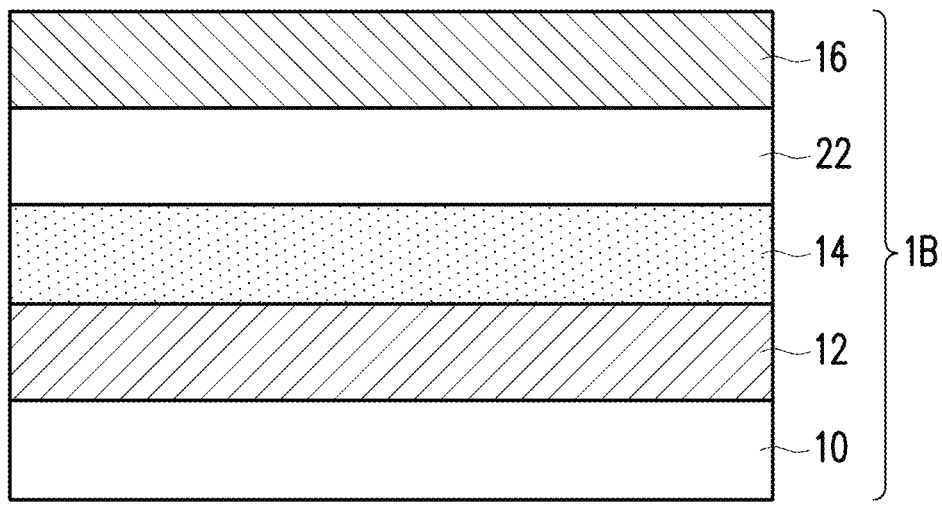

In some embodiments, as shown in FIG. 7, when the reflective polarizer 12 is a wire grid polarizer, the absorption axis of the dye-doped polymeric layer 14 may be defined by the wire grid polarizer, and the alignment layer 20 in FIG. 6 may be omitted in a sensing device 1B.

Figure 8:
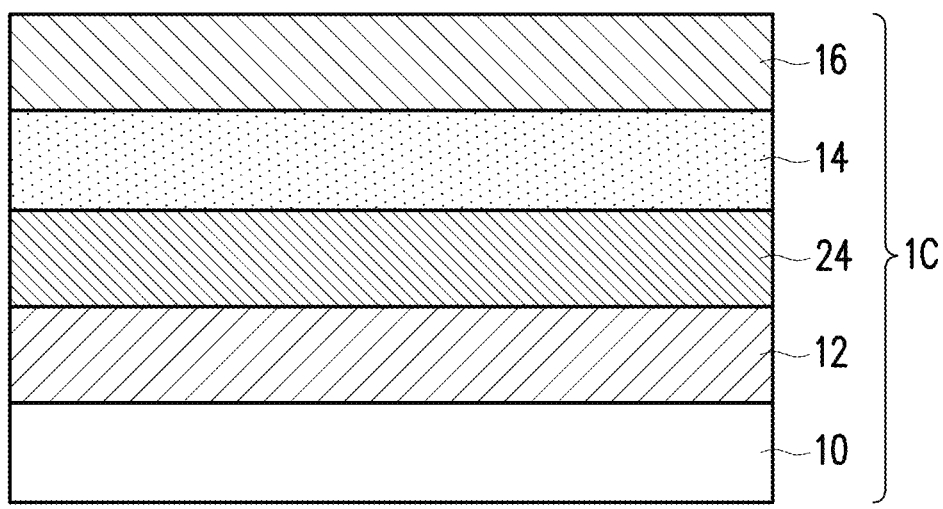

In some embodiments, as shown in FIG. 8, a sensing device 1C may further include a liquid crystal polymer layer 24 in addition to the sensor 10, the reflective polarizer 12, the dye-doped polymeric layer 14, and the patterned liquid crystal polymer layer 16. The liquid crystal polymer layer 24 is disposed between the reflective polarizer 12 and the dye-doped polymeric layer 14. In some embodiments, the liquid crystal polymer layer 24 is a patterned liquid crystal polymer layer that includes a plurality of regions having a plurality of different optical axis directions as described in FIG. 3A or FIG. 4A. In other embodiments, the liquid crystal polymer layer 24 is a non-patterned liquid crystal polymer layer that includes a single optical axis direction.

In some embodiments, the liquid crystal polymer layer 24 serves as a quarter waveplate for conversion between circular polarization and linear polarization, and an included angle (not shown in FIG. 8) between an optical axis (not shown in FIG. 8) of the liquid crystal polymer layer 24 and the transmittance axis (not shown in FIG. 8) of the dye-doped polymeric layer 14 may be 45 degrees, but not limited thereto.

Figure 9:
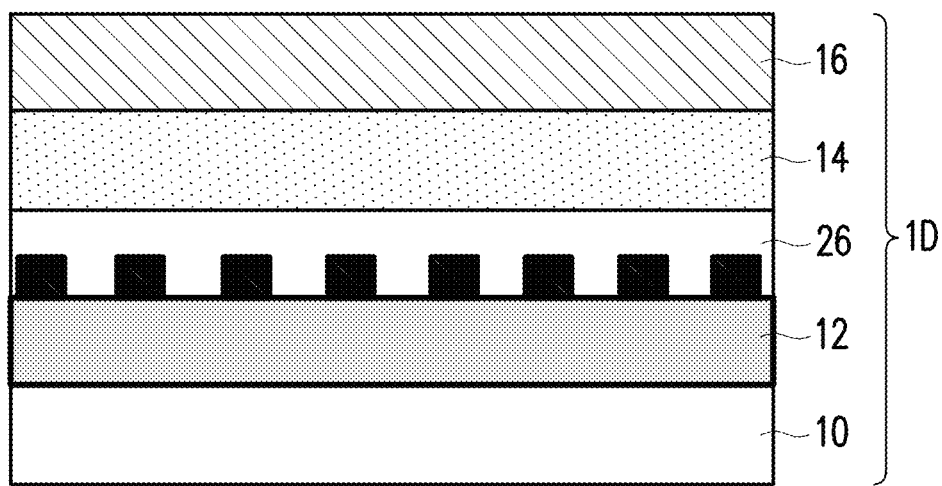

In some embodiments, as shown in FIG. 9, when the reflective polarizer 12 is a wire grid polarizer, a sensing device 1D may further include an overcoating layer 26 in addition to the sensor 10, the reflective polarizer 12, the dye-doped polymeric layer 14, and the patterned liquid crystal polymer layer 16. The overcoating layer 26 is coated on the wire grid polarizer for surface smoothing (e.g., to provide a flat surface to dispose the dye-doped polymeric layer 14). The overcoating layer 26 is light transmissive. For example, the overcoating layer 26 may be formed from inorganic or organic materials, but not limited thereto.

Figure 10:
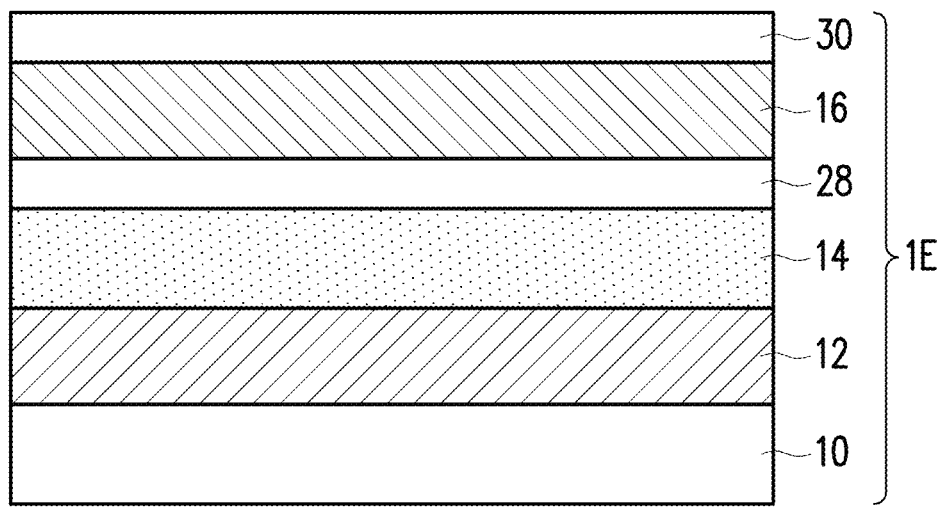

In some embodiments, as shown in FIG. 10, a sensing device 1E may further include a protection layer 28 and a protection layer 30 in addition to the sensor 10, the reflective polarizer 12, the dye-doped polymeric layer 14, and the patterned liquid crystal polymer layer 16. The protection layer 28 is disposed between the dye-doped polymeric layer 14 and the patterned liquid crystal polymer layer 16, and the protection layer 30 is disposed on the patterned liquid crystal polymer layer 16. The protection layer 28 and the protection layer 30 helps to protect the dye-doped polymeric layer 14 and the patterned liquid crystal polymer layer 16 from being dissolved by solvent. For example, the protection layer 28 and the protection layer 30 may be formed from inorganic materials, but not limited thereto. In other embodiments, the protection layer 28 and the protection layer 30 may be formed from organic materials.

In some embodiments, as shown in FIG. 11, when unpolarized light L1 incident on the sensing device 1 from the patterned liquid crystal polymer layer 16 side, since different regions (e.g., region RA and region RB) of the patterned liquid crystal polymer layer 16 allow different polarization light to pass through, different pixels (e.g., pixel P1 and pixel P2) of the sensor 10 receive different polarization light. For example, the pixel P1 only receives left-handed circular polarized light, while the pixel P2 only receives right-handed circular polarized light.

In some embodiments, as shown in FIG. 12, an organic light emitting display device 5 is disposed on the sensing device 1. The organic light emitting display device 5 includes an organic light emitting display panel 50, a quarter wave plate 52 disposed on the organic light emitting display panel 50, and a linear polarizer 54 disposed on the quarter wave plate 52.

For example, unpolarized light L1 turns into left-handed circular polarized light after passing through the linear polarizer 54 and the quarter wave plate 52. Since the organic light emitting display panel 50 is light transmissive, the left-handed circular polarized light passing through the quarter wave plate 52 passes through the organic light emitting display panel 50. In the embodiments where the region RA allows left-handed circular polarized light to pass through and the region RB allows right-handed circular polarized light to pass through, the left-handed circular polarized light originated from the unpolarized light L1 and transmitted to the region RB is blocked by the region RB and thus cannot be received by the pixel P2, while the left-handed circular polarized light originated from the unpolarized light L1 and transmitted to the region RA sequentially passes through the patterned liquid crystal polymer layer 16, the dye-doped polymeric layer 14, and the reflective polarizer 12 and then received by the pixel P1.

Unpolarized light L2 emitted from the organic light emitting display panel 50 incident on the sensing device 1 from the patterned liquid crystal polymer layer 16 side, wherein the light transmitted to the region RA turns into left-handed circular polarized light after passing through the region RA, and the light transmitted to the region RB turns into right-handed circular polarized light after passing through the region RB. The left-handed circular polarized light and the right-handed circular polarized light sequentially passes through the dye-doped polymeric layer 14 and the reflective polarizer 12 and then respectively received by the pixel P1 and pixel P2. Since the pixel P1 receives light from both the unpolarized light L1 and the unpolarized light L2, while the pixel P2 receives light only from the unpolarized light L2, the intensity of ambient light (e.g., the unpolarized light L1) can be determined by the pixel P1 and pixel P2. The brightness of the screen of the organic light emitting display device 5 can be controlled based on the intensity of ambient light.

In the sensing device provided in embodiments of the disclosure, light with undesired polarization would be reflected by the reflective polarizer and absorbed by the dye-doped polymeric layer, and thus light intensity of the light with undesired polarization to re-pass the reflective polarizer can be decreased and extinction ratio of the sensing device can be enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A sensing device, comprising:
   a sensor;
   a reflective polarizer disposed on the sensor and contacting the sensor;
   a dye-doped polymeric layer disposed on the reflective polarizer; and
   a patterned liquid crystal polymer layer disposed on the dye-doped polymeric layer, wherein the dye-doped polymeric layer includes an iodine dopant or a dichroic dye dopant,
   wherein the sensor is an ambient light sensor, a fingerprint recognition sensor, or an image sensor.

2. The sensing device according to claim 1, wherein the reflective polarizer is a wire grid polarizer.

3. The sensing device according to claim 2, wherein an absorption axis of the dye-doped polymeric layer is defined by the wire grid polarizer.

4. The sensing device according to claim 2, further comprising:
   an overcoating layer coated on the wire grid polarizer.

5. The sensing device according to claim 1, wherein the reflective polarizer includes a cholesteric liquid crystal polymer layer.

6. The sensing device according to claim 5, wherein the cholesteric liquid crystal polymer layer is a stacked layer of multiple layers with different pitches.

7. The sensing device according to claim 1, further comprising:
   an alignment layer disposed between the reflective polarizer and the dye-doped polymeric layer, wherein an absorption axis of the dye-doped polymeric layer is defined by the alignment layer.

8. The sensing device according to claim 1, wherein the patterned liquid crystal polymer layer serves as a half waveplate or a quarter waveplate.

9. The sensing device according to claim 1, wherein the patterned liquid crystal polymer layer includes a plurality of regions having a plurality of different optical axis directions.

10. The sensing device according to claim 1, wherein the patterned liquid crystal polymer layer is a stacked layer of multiple material layers with different birefringence.

11. The sensing device according to claim 1, wherein optical axes of the patterned liquid crystal polymer layer are twisted aligned in light propagation direction.

12. The sensing device according to claim 1, further comprising:
   an alignment layer disposed between the dye-doped polymeric layer and the patterned liquid crystal polymer layer, wherein optical axes of the patterned liquid crystal polymer layer are defined by the alignment layer.

13. The sensing device according to claim 1, further comprising:
   a liquid crystal polymer layer disposed between the reflective polarizer and the dye-doped polymeric layer.

14. The sensing device according to claim 13, wherein the liquid crystal polymer layer serves as a quarter waveplate.

15. The sensing device according to claim 13, wherein the liquid crystal polymer layer is a patterned liquid crystal polymer layer that includes a plurality of regions having a plurality of different optical axis directions.

16. The sensing device according to claim 13, wherein the liquid crystal polymer layer is a non-patterned liquid crystal polymer layer that includes a single optical axis direction.

17. The sensing device according to claim 1, further comprising:
   a protection layer disposed between the dye-doped polymeric layer and the patterned liquid crystal polymer layer.

18. The sensing device according to claim 1, further comprising:
   a protection layer disposed on the patterned liquid crystal polymer layer.

* * * * *